United States Patent
Stainvas Olshansky et al.

(10) Patent No.: US 10,215,851 B2
(45) Date of Patent: Feb. 26, 2019

(54) DOPPLER-BASED SEGMENTATION AND OPTICAL FLOW IN RADAR IMAGES

(71) Applicant: GM Global Technology Operations LLC, Detroit, MI (US)

(72) Inventors: Inna Stainvas Olshansky, Modiin (IL); Igal Bilik, Rehovot (IL); Oded Bialer, Petah Tikva (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 613 days.

(21) Appl. No.: 14/855,496

(22) Filed: Sep. 16, 2015

(65) Prior Publication Data
US 2016/0084953 A1    Mar. 24, 2016

Related U.S. Application Data

(60) Provisional application No. 62/052,696, filed on Sep. 19, 2014.

(51) Int. Cl.
*G01S 13/58*      (2006.01)
*G01S 13/89*      (2006.01)

(52) U.S. Cl.
CPC ............ *G01S 13/585* (2013.01); *G01S 13/89* (2013.01); *G06T 2207/10044* (2013.01)

(58) Field of Classification Search
CPC ...... G01S 13/585–13/605; G01S 13/89; G01S 13/931; G01S 2013/9314–2013/9396; G06T 2207/10044
See application file for complete search history.

(56) References Cited

U.S. PATENT DOCUMENTS

| | | | |
|---|---|---|---|
| 4,906,940 A | 3/1990 | Greene et al. | |
| 5,546,084 A | 8/1996 | Hindman | |
| 6,258,029 B1* | 7/2001 | Guracar | A61B 8/08 600/443 |
| 7,054,467 B1* | 5/2006 | Honda | G01S 3/784 382/104 |
| 7,437,243 B2* | 10/2008 | Fujimoto | G06T 7/20 340/436 |
| 7,667,581 B2* | 2/2010 | Fujimoto | G06K 9/00369 340/425.5 |

(Continued)

FOREIGN PATENT DOCUMENTS

| | | |
|---|---|---|
| CN | 102645679 A | 8/2012 |
| CN | 102681033 A | 9/2012 |
| KR | 20130081643 A | 7/2013 |

OTHER PUBLICATIONS

Allan Jepson and Michael Black; "Mixture Models for Optical Flow Computation"; Canadian Institute for Advanced Research, and Department of Computer Science, University of Toronto; Xerox PARC; Apr. 1993; 17 pages.

(Continued)

*Primary Examiner* — Matthew M Barker
(74) *Attorney, Agent, or Firm* — Cantor Colburn LLP

(57) ABSTRACT

In an embodiment, a method for processing an image is provided. The method receives an image including a plurality of pixels. Each pixel includes radial velocity information. The method categorizes the plurality of pixels of the image into a plurality of groups of pixels based on radial velocity information of the pixels. The method associates at least one of the groups of pixels with an object.

12 Claims, 2 Drawing Sheets

(56) References Cited

U.S. PATENT DOCUMENTS

| | | | | |
|---|---|---|---|---|
| 7,746,450 | B2* | 6/2010 | Willner | G01S 7/491 |
| | | | | 356/28 |
| 7,747,039 | B2* | 6/2010 | Fujimoto | G06K 9/00362 |
| | | | | 340/435 |
| 7,899,211 | B2* | 3/2011 | Fujimoto | G06K 9/00798 |
| | | | | 340/436 |
| 8,102,915 | B2* | 1/2012 | Klein Gunnewiek | G06T 7/207 |
| | | | | 348/416.1 |
| 8,686,326 | B1 | 4/2014 | Dennison et al. | |
| 8,831,357 | B2* | 9/2014 | Rudin | G06K 9/00771 |
| | | | | 382/218 |
| 9,565,377 | B2* | 2/2017 | Hamann | H04N 5/23296 |
| 9,784,829 | B2 | 10/2017 | Zeng et al. | |
| 2003/0210807 | A1 | 11/2003 | Sato et al. | |
| 2009/0252377 | A1 | 10/2009 | Akita et al. | |
| 2009/0309966 | A1* | 12/2009 | Chen | G06T 7/20 |
| | | | | 348/135 |
| 2011/0135159 | A1 | 6/2011 | Uchida | |
| 2011/0169957 | A1 | 7/2011 | Bartz | |
| 2011/0239923 | A1 | 10/2011 | Elmbo | |
| 2012/0314071 | A1 | 12/2012 | Rosenbaum et al. | |
| 2015/0049168 | A1* | 2/2015 | Dielacher | G06K 9/00805 |
| | | | | 348/46 |
| 2015/0336547 | A1 | 11/2015 | Dagan | |

OTHER PUBLICATIONS

David J. Fleet and Yair Weiss; "Optical Flow Estimation"; Mathmatical Models in Computer Vision: The Handbook, Chapter 15; Springer; 2005; pp. 239-258.

Rafael Alves Bonfim de Queiroz et al.; "Determining Optical Flow Using a Modified Horn and Schunck's Algorithm"; National Laboratory for Scientific Computing—LNCC; Jan. 2010; 6 pages.

* cited by examiner

DOPPLER-BASED SEGMENTATION AND OPTICAL FLOW IN RADAR IMAGES

CROSS-REFERENCE TO RELATED APPLICATION

This application is a Non-Provisional of U.S. Provisional Patent Application Ser. No. 62/052,696 filed Sep. 19, 2014, the disclosure of which is incorporated by reference herein in its entirety.

FIELD OF THE INVENTION

The subject invention relates to processing digital images using computer vision techniques and, more specifically, using computer vision techniques that are modified to use radial velocity information of the pixels of the images when processing the images.

BACKGROUND

Many computer vision techniques for processing digital images have been used, in order to extract useful information from the digital images. For instance, image segmentation techniques partition an image into multiple segments in order to locate objects and boundaries (e.g., lines and curves) in images. Optical flow techniques are used to study motion of objects, surfaces, and edges in images caused by the relative motion between an observer (an eye or a camera) and the scene. Specifically, optical flow techniques are used to estimate optical flow (i.e., velocity of movement of a pixel of an image to another location in another image). Optical flow techniques are used for motion estimation, data compression, robot navigation, and object tracking.

SUMMARY OF THE INVENTION

In one exemplary embodiment of the invention, a method for processing an image is provided. The method receives an image including a plurality of pixels. Each pixel includes radial velocity information. The method categorizes the plurality of pixels of the image into a plurality of groups of pixels based on radial velocity information of the pixels. The method associates at least one of the groups of pixels with an object.

In another exemplary embodiment of the invention, a system for processing an image is provided. The system includes a radar configured to generate an image that includes a plurality of pixels. Each pixel includes radial velocity information. The system also includes an image processing module configured to categorize the plurality of pixels of the image into a plurality of groups of pixels based on radial velocity information of the pixels and associate at least one of the groups of pixels with an object.

In another exemplary embodiment of the invention, a computer program product for processing an image is provided. The computer program product comprises a computer readable storage medium having program instructions embodied therewith. The program instructions are readable by a processing circuit to cause the processing circuit to perform a method. The method receives an image including a plurality of pixels. Each pixel includes radial velocity information. The method categorizes the plurality of pixels of the image into a plurality of groups of pixels based on radial velocity information of the pixels. The method associates at least one of the groups of pixels with an object.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
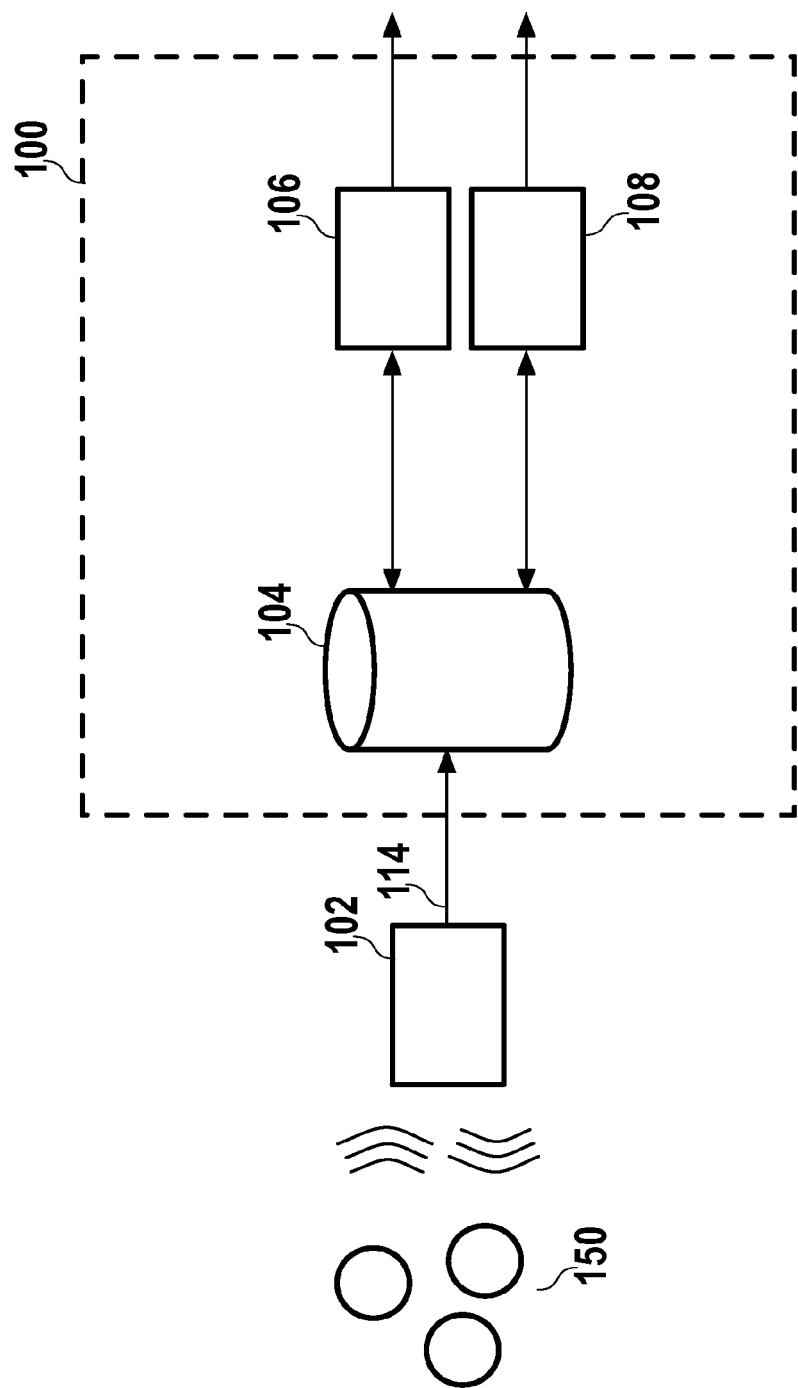
FIG. 1 depicts a radar and an image processing system in accordance with embodiments of the invention.

The following description is merely exemplary in nature and is not intended to limit the present disclosure, its application or uses. It should be understood that throughout the drawings, corresponding reference numerals indicate like or corresponding parts and features.

Images generated by high-resolution imaging radars carry more information than the images generated by conventional radar systems or the images generated by conventional camera systems. This is because an object shown in an image generated by a high-resolution imaging radar is represented by a larger number of pixels showing more details of the object while an object shown in an image generated by a conventional radar system is a lower resolution image where a smaller number of pixels (e.g., a dot) represent the object. Moreover, an image generated by a high-resolution imaging radar carries more information than an image generated by a conventional imaging system because a conventional camera system does not capture radial velocity information for the pixels in the image.

In embodiments, an image generated by a high-resolution imaging radar includes radial velocity information in addition to range information, elevation information, and azimuth information, which an image generated by a conventional radar includes. Specifically, in embodiments, every pixel in an image generated by a high-resolution image radar includes radial velocity information, range information, elevation information, azimuth information and the measured reflected intensities. The radial velocity information for a pixel indicates a radial velocity of the pixel measured by the radar based on a motion of an object relative to the radar. The range information for a pixel indicates a distance between the object and the radar. The elevation information indicates an elevation angle from the radar to the object. The azimuth information indicates an azimuth angle from the radar to the object. The radial velocity information, the range information, the elevation information and the azimuth information for a pixel are generated by the radar using a spherical coordinate system. The radar, however, may be configured to use other coordinate system such as a Cartesian coordinate system and generate images, of which pixels have coordinate information according to the other coordinate system.

Generally speaking, the methods and systems of the embodiments of the invention adapt computer vision techniques to using the radial velocity information for pixels in the images or frames generated by a high-resolution image radar and use the adapted computer vision techniques to process one or more of the images. The computer vision techniques that the methods and systems of the embodiments of the invention adapt to using the radial velocity information include segmentation techniques and optical flow techniques.

In accordance with an exemplary embodiment of the invention, FIG. 1 depicts an image processing system 100 and a radar 102. In embodiments, the image processing system 100 includes one or more modules such as a datastore 104, a segmentation module 106 and an optical flow estimation module 108. As used herein, the term "module" or "sub-module" refers to an application specific integrated circuit (ASIC), an electronic circuit, a processor (shared, dedicated, or group) and memory that executes one or more software or firmware programs, a combinational logic circuit, and/or other suitable components that provide the described functionality. When implemented in software, a module or a sub-module can be embodied in memory as a non-transitory machine-readable storage medium readable by a processing circuit and storing instructions for execution by the processing circuit for performing a method. Moreover, the modules shown in FIG. 1 may be combined and/or further partitioned. In embodiments, the image processing system 100 and the radar 102 operate in a vehicle.

The radar 102 generates high-resolution images or frames of the environment around the image processing system 100. The radar 102 captures sequential images 114 of radar data, which are passed to the image processing system 100 for image processing and analysis. In embodiments, the radar 102 is configured to perform a Doppler analysis on one or more moving objects 150 that may be present in the range of the radar 102 to generate radial velocity information for each pixel of an image that the radar 102 captures. The radar 102 also generates range information, elevation information, and azimuth information for each pixel of the image, in addition to the radial velocity information. Moreover, the radar 102 generates intensity information for each pixel that indicates one or more intensity or brightness values of the pixel.

The datastore 104 of the image processing system 100 stores the images 114 received from the radar 102. In embodiments, an encoder module (not shown) may encode the images 114 before storing the images in the datastore 104, and a decoder module may decode the encoded images when the segmentation module 106 and the optical flow estimation module 108 retrieve the images from the datastore 104.

The segmentation module 106 implements one or more segmentation techniques to apply to the images from the radar 102, in order to identify objects and boundaries in the images. In embodiments, the segmentation techniques that the segmentation module 106 implements use the radial velocity information of the pixels in an image, in addition to other information associated with the pixels such as the intensity information. The segmentation module 106 sends the processed images with identified objects and boundaries to another system (not shown) that uses the processed images. For instance, the image processing system 100 of the embodiments that operates in a vehicle sends the processed images to another system (not shown) that implements safety features (e.g., detecting other vehicles, pedestrians, other obstacles, etc.) for the vehicle.

The segmentation techniques that the segmentation module 106 implements include conventional segmentation techniques that are adapted to using the radial velocity information in accordance with the embodiments of the invention. There are numerous conventional segmentation techniques that may be adapted to using the radial velocity information. Example conventional segmentation techniques include region-growing techniques, clustering techniques, edge-based (or edge detection) techniques and model-based techniques.

The region-growing techniques start from one or more seed pixels in an image as an object's representative pixels. The region-growing techniques apply one or more similarity criteria to the pixels that neighbor the seed pixels in order to determine whether the neighboring pixels are sufficiently similar to the seed pixels to represent the same object. In embodiments, the similarity criteria includes whether a difference between the radial velocities of two pixels is smaller than a threshold radial velocity difference. If the difference between the radial velocities is smaller than the threshold difference, the region-growing techniques determine that the two pixels are sufficiently similar to represent the same object. Other similar criteria (e.g., whether a difference between the intensity values of the two pixels is smaller than a threshold intensity difference), may complement in determining whether two pixels are sufficiently similar to represent the same object. The region-growing techniques that are adapted to using the radial velocity information may be used to detect objects in the image based on pulse-coupled neural network (PCNN).

The clustering techniques cluster pixels of an image into one or more regions within the image that represent the same objects based on, e.g., the similarities in intensity values. In embodiments, the clustering techniques are adapted to using the radial velocity information of the pixels in an image. The clustering techniques that the embodiments of the invention adapt to using the radial velocity information include K-means algorithm, which is an iterative technique that is used to partition an image into K clusters, where K is a positive integer. The K-means algorithm (1) picks K cluster centers, either randomly or based on heuristic, (2) assigns each pixel in the image to the cluster that minimizes the "distance" between the pixel and the corresponding cluster center, (3) re-computes the cluster centers by averaging properties (e.g., intensities) of all pixels in the cluster, and (4) repeats (2) and (3) until convergence is attained (i.e., no pixels change clusters any further). The "distance" between the pixel and the cluster center is the squared or absolute difference between the properties (e.g., intensities, color values, locations, etc.), or a weighted combination of the properties. K can be selected manually, randomly, or by a heuristic. In embodiments, the K-means algorithm is adapted to using the radial velocity information of the pixels such that the "distance" between the pixel and the cluster center includes a squared or absolute difference between radial velocity of the pixel and the radial velocity of the cluster center.

The edge-based techniques detect an object in an image by identifying discrete edges in the image and connecting the edges into boundaries of the objects in the image. The edges occur where, for example, intensity values of adjacent pixels change abruptly. In embodiments, the edge-based techniques are adapted to using the radial velocity information for pixels in an image to detect edges in the image. That is, the adapted edge-based techniques consider abrupt changes in the radial velocities (e.g., a change or a difference between radial velocities of two pixels is greater than a threshold radial velocity difference) as an indication of an edge in the image.

The model-based techniques use a probabilistic model (e.g. Markov random field) to identify objects in an image. That is, the model-based techniques define a probability of a pixel in the image belonging to a particular object in the image based on the probabilistic models of the objects. In embodiments, the model-based techniques are adapted to using the radial velocity information for the pixels in an image to build a probabilistic model of an object and to define a probability of a pixel belonging to the object.

The optical flow estimation module 108 implements one or more optical flow techniques to estimate optical flow of each pixel of an image in a sequence of images generated by the radar 102. In embodiments, the optical flow techniques that the optical flow estimation module 108 implements are adapted to using the radial velocity information of the pixels in an image, in addition to other information associated with the pixels such as the intensity information. The optical flow estimation module 108 sends the processed images with the estimated optical flows to another system (not shown) that uses the processed images. For instance, the image processing system 100 of the embodiments that operates in a vehicle sends the processed images to another system (not shown) that implements safety features (e.g., responding to motions of other vehicles, pedestrians, other obstacles, etc.) for the vehicle.

There are numerous conventional optical flow techniques that may be adapted by the embodiments of the invention to using the radial velocity information. Example conventional optical flow techniques include Lukas Kanade (LK) techniques, weighted LK techniques, discrete optimization techniques, shift flow techniques and weighted LK techniques with incorporated motion models.

The conventional optical flow techniques are based on estimation of instantaneous image velocities or discrete image displacements using a sequence of ordered images. The instantaneous image velocities in the Cartesian coordinate system are defined by the following Equation 1:

$$V(r) = [V_x(r), V_y(r), V_z(r)] \qquad \text{Equation 1}$$

where $V(r)$ represents an instantaneous velocity of pixel r from one image to the next image in the sequence; r represents pixel coordinate values (e.g., x, y, and z coordinate values in Cartesian coordinate system) of each particular pixel of an image in the sequence; $V_x(r)$ represents x-coordinate pixel velocity of the particular pixel; $V_y(r)$ represents y-coordinate pixel velocity of the particular pixel; and $V_z(r)$ represents z-coordinate pixel velocity of the particular pixel. The conventional optical flow techniques determine an image velocity for an image by imposing an intensity constancy constraint on Equation 1. The following Equation 2 represents the intensity constancy constraint, which is that the intensities or brightness of pixels in the first image of two consecutive images in the sequence and the corresponding pixels in the second image of the two consecutive images do not change:

$$I(r+V, t+\Delta t) = I(r,t) \qquad \text{Equation 2}$$

where $I(r, t)$ represents the intensity values of the first image of the two images—the intensity at time t and position r (i.e., x, y and z coordinate values); $I(r+V, t+\Delta t)$ represents the intensity values of the second image of the two images; V represents coordinate vector having x, y and z component vectors; and $\Delta t$ represents a time gap between two instances in time at which the two images were captured. Linearization of Equation 2 in the Taylor series leads to an approximation represented by the following Equation 3, which is referred to as the intensity constancy constraint equation:

$$\nabla I(r,t) \cdot V(r,t) + I_t(r,t) = 0 \qquad \text{Equation 3}$$

where $\nabla I$ is:

$$\left[ \frac{\partial I}{\partial x}, \frac{\partial I}{\partial y}, \frac{\partial I}{\partial z} \right]$$

In Equation 3, $\nabla I(r, t)$ is a gradient vector of the intensities of the pixels of the image (i.e., $I(r)$), and $I_t(r, t)$ is a partial derivative over time t. (Hereinafter, time t is omitted in the equations and terms). These values are calculated from consecutive images based on numerical discretization. The intensity constancy constraint alone, however, is insufficient in solving for the three unknown velocity components (i.e., $V_x$, $V_y$, and $V_z$). Therefore, in order to solve for these unknowns, additional constraints are necessary.

Different conventional optical flow techniques are different in that they impose different additional constraints. For instance, the LK techniques impose a local velocity constancy constraint, which is that V, the coordinate vector having $V_x$, $V_y$, and $V_z$, is assumed to be constant within a spatial neighborhood of a particular pixel at r (i.e., a spatial window around a particular pixel at r). That is, Equation 3 is assumed to hold for all neighboring pixels of the particular pixel. Therefore, Equation 3 may be rewritten into Equation 4:

$$\nabla I(q) \cdot V(r) + I_t(q) = 0 \qquad \text{Equation 4}$$

where q represents each of the pixels that are spatial neighbors of the particular pixel r in an image in the sequence; and $I_t(q)$ is a partial derivative over time t. The LK techniques then obtain a solution based on the least squares principle—the overall solution minimizes the sum of the squares of the errors made in the results of every single equation. The solution is expressed as Equation 5:

$$V = (A^T A)^{-1} A^T b \qquad \text{Equation 5}$$

where A is a n-by-three matrix in which n is the number of neighboring pixels of the particular pixel r and is built by concatenation of gradients $\nabla I(q)$ for neighboring pixels q. That is, the Matrix A in this solution is (referred to as Matrix 1):

$$\begin{bmatrix} \nabla I_x(q_1) & \nabla I_x(q_2) & \ldots & \nabla I_x(q_n) \\ \nabla I_y(q_1) & \nabla I_y(q_2) & \ldots & \nabla I_y(q_n) \\ \nabla I_z(q_1) & \nabla I_z(q_2) & \ldots & \nabla I_z(q_n) \end{bmatrix}^T \qquad \text{Matrix 1}$$

The Vector b is given by (referred to as Vector 1):

$$-[I_t(q_1) I_t(q_2) \ldots I_t(q_n)]^T \qquad \text{Vector 1}$$

In embodiments, the conventional LK techniques are adapted to using the radial velocity information for each pixel in an image as an additional constraint to solve for the image velocity $V(r)$ in Equation 3. Specifically, the radial velocity information provides the radial component of the image velocity $V(r)$. The radial velocity information for each pixel as an additional constraint may be expressed as Equation 6:

$$e_r \cdot V(r) = V_D(r) \qquad \text{Equation 6}$$

where $V(r)$ is the image velocity of an image in the sequence; $V_D(r)$ is the radial velocity of a particular pixel at r; and $e_r$ is expressed as:

$$\frac{r}{\|r\|}$$

This additional linear constraint imposed on Equation 3 facilitates more accurate and stable estimation of the optical flow per each pixel. With this additional constraint imposed on Equation 3, Matrix A in a solution given by Equation 5 is a 2n-by-three matrix:

$$\begin{bmatrix} \nabla I_x(q_1) & \nabla I_x(q_2) & \ldots & \nabla I_x(q_n) & e_{x,1} & e_{x,2} & \ldots & e_{x,n} \\ \nabla I_y(q_1) & \nabla I_y(q_2) & \ldots & \nabla I_y(q_n) & e_{y,1} & e_{y,2} & \ldots & e_{y,n} \\ \nabla I_z(q_1) & \nabla I_z(q_2) & \ldots & \nabla I_z(q_n) & e_{z,1} & e_{z,2} & \ldots & e_{z,n} \end{bmatrix}^T \quad \text{Matrix 2}$$

where $e_{r,n}$ is expressed as:

$$\frac{q_n}{\|q_n\|}$$

Then, the Vector b is given by (referred to as Vector 2):

$$-[I_t(q_1) I_t(q_2) \ldots I_t(q_n) - V_D(q_1) - V_D(q_2) \ldots - V_D(q_n)]^T \quad \text{Vector 2}$$

Doubling the number of constraints allows for using a smaller number of neighboring pixels for each particular pixel (i.e., a reduction of the window size by $\sqrt{2}$ for two-dimensional radar images or by $\sqrt[3]{\sqrt{2}}$ for three-dimensional radar images). Also, using the radial velocity information as a constraint results in a better estimation of optical flow than using the local velocity constraint imposed by the conventional LK techniques.

The least squares principle provides the same importance to all neighboring pixels for a particular pixel. In the weighted LK techniques, the neighboring pixels are weighted. Therefore, in embodiments, Matrix 1 is re-written as Matrix 3 to include weights:

$$\begin{bmatrix} w_1 \nabla I_x(q_1) & w_2 \nabla I_x(q_2) & \ldots & w_n \nabla I_x(q_n) \\ w_1 \nabla I_y(q_1) & w_2 \nabla I_y(q_2) & \ldots & w_n \nabla I_y(q_n) \\ w_1 \nabla I_z(q_1) & w_2 \nabla I_z(q_2) & \ldots & w_n \nabla I_z(q_n) \end{bmatrix}^T \quad \text{Matrix 3}$$

Moreover, Vector 1 may be re-written as Vector 3:

$$-[w_1 I_t(q_1) w_2 I_t(q_2) \ldots w_n I_t(q_n)]^T \quad \text{Vector 3}$$

It is to be noted that, in embodiments, Matrix 2 is similarly modified to include the weights. Matrix 2 re-written to include the weights is the following Matrix 4:

$$\begin{bmatrix} w_1 \nabla I_x(q_1) & w_2 \nabla I_x(q_2) & \ldots & w_n \nabla I_x(q_n) & w_1 e_{x,1} & w_2 e_{x,2} & \ldots & w_n e_{x,n} \\ w_1 \nabla I_y(q_1) & w_2 \nabla I_y(q_2) & \ldots & w_n \nabla I_y(q_n) & w_1 e_{y,1} & w_2 e_{y,2} & \ldots & w_n e_{y,n} \\ w_1 \nabla I_z(q_1) & w_2 \nabla I_z(q_2) & \ldots & w_n \nabla I_z(q_n) & w_1 e_{z,1} & w_2 e_{z,2} & \ldots & w_n e_{z,n} \end{bmatrix}^T \quad \text{Matrix 4}$$

Vector 3 is re-written as (referred to as Vector 4):

$$[w_1 I_t(q_1) w_2 I_t(q_2) \ldots w_n I_t(q_n) - w_1 V_D(q_1) - w_2 V_D(q_2) \ldots - w_n I_t V_D(q_n)] \quad \text{Vector 4}$$

In embodiments, the weights in Matrices 3 and 4 and Vectors 3 and 4 are modeled as a kernel function and decrease with the distance between the neighboring pixels and the particular pixel at r. The weights modeled as a kernel function may be expressed as Equation 7:

$$w_k = K_s(\|q_k - r\|) \quad \text{Equation 7}$$

where $K_s$ is a kernel function.

Another way of using the radial velocity information of the pixels as a constraint is transferring the local velocity constancy constraint of the LK techniques to corresponding relationship for radial velocity information and using the corresponding relationship for modeling the weighting coefficients $w_k$. That is, the weighting coefficients may be determined based on an assumption that the radial velocities of neighboring pixels of a particular pixel are constant. This assumption leads to the following Equations 8 and 9:

$$V_D(q_k) = \|V(r)\| \cos(e_k, V(r)) \quad \text{Equation 8}$$

$$V_D(r) = \|V(r)\| \cos(e_r, V(r)) \quad \text{Equation 9}$$

where $V_D(q_k)$ represents the radial velocity of a neighboring pixel at $q_k$; and $V_D(r)$ is the radial velocity of a particular pixel at r. A difference between radial components is computed by subtracting Equation 9 from Equation 8 as the following Equation 10 shows:

$$|V_D(q_k) - V_D(r)| = \|V(r)\| \cdot |\cos([e_r, V(r)]) - \cos([e_k, V(r)])| \quad \text{Equation 10}$$

$$= 2\|V(r)\| \cdot \left|\sin\left(\frac{\delta_k}{2}\right)\sin\left([e_r, V(r)] + \frac{\delta_k}{2}\right)\right|$$

$$= 2\left|\sin\left(\frac{\delta_k}{2}\right)\left(V_\tau(r)\cos\left(\frac{\delta_k}{2}\right) + V_d(r)\sin\left(\frac{\delta_k}{2}\right)\right)\right|$$

$$= |V_\tau(r)\sin(\delta_k) + V_D(r)(1 - \cos(\delta_k))|$$

where $\delta_k$ is an angle between $e_r$ and $e_{qk}$. This assumption that $\delta_k$ does not change considerably within the spatial neighborhood of a particular pixel r (i.e., $\delta_k$ is small) allows for modeling the weighting coefficients as the following Equation 11 shows:

$$w_k = K_s(\|q_k - r\|) \cdot K_D(\|V_D(q_k) - V_D(r)\|) \quad \text{Equation 11}$$

wherein $K_D$ is a kernel function.

In embodiments, the weighting coefficients computed based on Equation 11 are used in the solution computed by imposing the local velocity constancy constraint, i.e., Matrix 1 and Vector 1, as well as in the solution computed by imposing the radial velocity constraint, i.e., Matrix 2 and Vector 2. Moreover, in embodiments, the kernel function $K_D$ may be corrected as shown in Equation 12:

$$w_k = K_s(\|q_k - r\|) \cdot K_D\left(\frac{\|V_D(q_k) - V_D(r)\|}{1 - \cos(\delta_k)}\right) \quad \text{Equation 12}$$

It is to be noted that the radial velocity constraints of the embodiments of the invention are applicable to the Horn-Schunck algorithm for motion estimation that uses smoothness constraint on the motion field and switches to robust methods assuming non-Gaussian mean-zero assumptions:

$$\varepsilon(r) = \nabla I(r,t) \cdot V(r,t) + I_t(r,t) \quad \text{Equation 13}$$

The Horn-Schunck algorithm is described in B. K. P. Horn and B. G. Schunk, Determining optical flow, Artificial Intelligence, vol. 17:185-203, 1981, which is incorporated herein by reference.

The radial velocity constraints of the embodiments of the invention may also be used as constraints on the motion field in the probabilistic formulation of the motion estimation described in D. J. Fleet and Y. Weiss, "Optical Flow Estimation", chapter 5, 2006, which is incorporated herein by reference. The radial velocity constraints of the embodiments of the invention may be incorporated into the mixture models addressed using expectation-maximization (EM) approach, described in A. Jepson and M. J. Black, "Mixture models for optical flow computation", In Proc. IEEE Computer Vision and Pattern Recognition, CVPR-93, pages 760-761, New York, June 1993, which is incorporated herein by reference.

Figure 2:
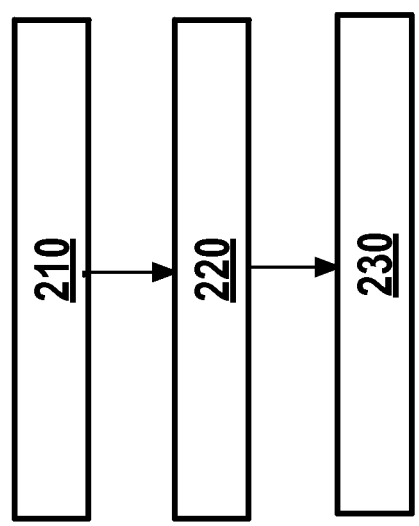
FIG. 2 is a flowchart illustrating a method for processing an image in accordance with embodiments of the invention.

Referring now to FIG. 2, and with continued reference to FIG. 1, a flowchart illustrates a method for compressing a sequence of images. In embodiments, the method can be performed by the image processing system 100 of FIG. 1. As can be appreciated in light of the disclosure, the order of operation within the method is not limited to the sequential execution as illustrated in FIG. 2, but may be performed in one or more varying orders as applicable and in accordance with the present disclosure. In embodiments, the method can be scheduled to run based on predetermined events, and/or run continually during operation of the image processing system 100.

At block 210, the image processing system 100 receives an image including a plurality of pixels from the radar 102. Each of the pixels includes radial velocity information. The radial velocity information indicates a radial velocity of each of the pixels in the plurality of pixels measured by the radar 102 based on a motion of an object relative to the radar 102. Each of the pixels also includes intensity information.

At block 220, the image processing system 100 categorizes the plurality of pixels of the image into a plurality of groups of pixels based on radial velocity information of the pixels as well as the intensity information of the pixels. The image processing system 100 determines whether one pixel of the plurality of pixels is sufficiently similar to another pixel of the plurality of pixels based on the radial velocity information for the two pixels, by comparing the radial velocity information for the one pixel and the radial velocity information for the other pixel. In embodiments, the image processing system 100 uses an image segmentation technique that is adapted to using the radial velocity information of the pixels in order to categorize the pixels.

At block 230, the image processing system 100 associates at least one of the groups of pixels with an object.

Figure 3:
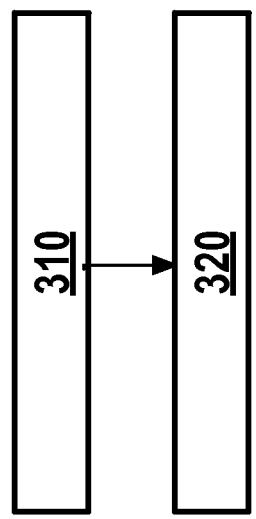
FIG. 3 is a flowchart illustrating a method for processing a sequence of images in accordance with embodiments of the invention.

Referring now to FIG. 3, and with continued reference to FIG. 1, a flowchart illustrates a method for compressing a sequence of images. In embodiments, the method can be performed by the image processing system 100 of FIG. 1. As can be appreciated in light of the disclosure, the order of operation within the method is not limited to the sequential execution as illustrated in FIG. 3, but may be performed in one or more varying orders as applicable and in accordance with the present disclosure. In embodiments, the method can be scheduled to run based on predetermined events, and/or run continually during operation of the image processing system 100.

At block 310, the image processing system 100 receives a sequence of images from the radar 102. Each image in the sequence includes a plurality of pixels. Each of the pixels includes radial velocity information. The radial velocity information indicates a radial velocity of each of the pixels in the plurality of pixels measured by the radar 102 based on a motion of an object relative to the radar 102. Each of the pixels includes intensity information. Each pixel in the plurality of pixels includes location information such as an x-coordinate value, a y-coordinate value and a z-coordinate value.

At block 320 the image processing system 100 estimates optical flow for the pixels within an image in the sequence of images by using the radial velocity information for the pixels as a constraint. The radial velocity information for each of the pixels is used as a constraint to solve the intensity constancy constraint equation for the optical flow for the pixels based on assumption that the radial velocities of a plurality of pixels that are spatially adjacent to a particular pixel in an image are constant. The image processing system 100 also uses the intensity information as another constraint. The image processing system 100 uses an optical flow technique that is adapted to using the radial velocity information of the pixel in order to estimate optical flow for the pixel.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A computer-implemented method for operating a radar, comprising:
    capturing, at a radar, an image of radar data generated by reflection of a signal from an object in an environment of the radar, the signal being transmitted by the radar;
    performing, at the radar, Doppler analysis on the radar data to obtain radial velocity information of the environment;
    generating, by the radar, an image of the environment, wherein the image includes a plurality of pixels, each pixel including radial velocity information;
    categorizing, by a computer, the plurality of pixels of the image into a plurality of groups of pixels based on radial velocity information of the pixels; and
    associating at least one of the groups of pixels with the object.

2. The method of claim 1, wherein the radial velocity information indicates a radial velocity of each of the pixels measured by a radar based on a motion of an object relative to the radar.

3. The method of claim 1, further comprising applying an image segmentation technique to the image, the image segmentation technique being adapted to use the radial velocity information of the pixels in order to categorize the pixels.

4. The method of claim 1, wherein each pixel further includes intensity information, wherein the categorizing is further based on the intensity information of the pixels.

5. The method of claim 1, wherein the categorizing comprises determining whether one pixel of the plurality of pixels is sufficiently similar to another pixel of the plurality of pixels based on the radial velocity information for the two pixels.

6. The method of claim 1, wherein the categorizing comprises comparing the radial velocity information for one pixel of the plurality of pixels and the radial velocity information for another pixel of the plurality of pixels.

7. A system, comprising:
   a radar configured to:
      capture an image of radar data generated by reflection of a signal from an object in an environment of the radar, the signal being transmitted by the radar;
      perform Doppler analysis on the radar data to obtain radial velocity information of an environment including an object;
      generate an image of the environment that includes a plurality of pixels, each pixel including radial velocity information; and
   an image processing module configured to:
      categorize the plurality of pixels of the image into a plurality of groups of pixels based on radial velocity information of the pixels, and
      associate at least one of the groups of pixels with the object.

8. The system of claim 7, wherein the radial velocity information indicates a radial velocity of each of the pixels measured by the radar based on a motion of an object relative to the radar.

9. The system of claim 7, wherein the image processing module is configured to apply an image segmentation technique to the image, the image processing module being adapted to use the radial velocity information of the pixels in order to categorize the pixels.

10. The system of claim 7, wherein each pixel further includes intensity information, wherein the categorizing is further based on the intensity information of the pixels.

11. The system of claim 7, wherein the image processing module is configured to categorize by determining whether one pixel of the plurality of pixels is sufficiently similar to another pixel of the plurality of pixels based on the radial velocity information for the two pixels.

12. The system of claim 7, wherein the image processing module is configured to categorize by comparing the radial velocity information for one pixel of the plurality of pixels and the radial velocity information for another pixel of the plurality of pixels.

* * * * *